United States Patent  (10) Patent No.: US 10,194,135 B2
Ge et al.  (45) Date of Patent: Jan. 29, 2019

(54) THREE-DIMENSIONAL DEPTH PERCEPTION APPARATUS AND METHOD

(71) Applicants: Chenyang Ge, Xi'an (CN); Nanning Zheng, Xi'an (CN); Yanhui Zhou, Xi'an (CN)

(72) Inventors: Chenyang Ge, Xi'an (CN); Nanning Zheng, Xi'an (CN); Yanhui Zhou, Xi'an (CN)

( * ) Notice: Subject to any disclaimer, the term of this patent is extended or adjusted under 35 U.S.C. 154(b) by 182 days.

(21) Appl. No.: 15/214,755

(22) Filed: Jul. 20, 2016

(65) Prior Publication Data

US 2017/0310946 A1 Oct. 26, 2017

(30) Foreign Application Priority Data

Apr. 21, 2016 (CN) .......................... 2016 1 0250214

(51) Int. Cl.
*H04N 13/00* (2018.01)
*G06T 7/00* (2017.01)
(Continued)

(52) U.S. Cl.
CPC ......... *H04N 13/204* (2018.05); *H04N 13/239* (2018.05); *H04N 13/254* (2018.05);
(Continued)

(58) Field of Classification Search
USPC ........................................................ 348/46
See application file for complete search history.

(56) References Cited

U.S. PATENT DOCUMENTS 9,313,376 B1 * 4/2016 Bertolami .......... H04N 1/00161
2013/0027548 A1 1/2013 Gere
(Continued)

FOREIGN PATENT DOCUMENTS

CN 103278139 A 9/2013
CN 103796004 A 5/2014
(Continued)

OTHER PUBLICATIONS

Office Action from SIPO for Chinese Patent Applicaiton No. 201610250214.3.
(Continued)

*Primary Examiner* — Jorge L Ortiz Criado
*Assistant Examiner* — Susan E. Hodges
(74) *Attorney, Agent, or Firm* — Dragon Sun Law Firm, P.C.; Jinggao Li, Esq.

(57) ABSTRACT

A three-dimensional depth perception apparatus includes a synchronized trigger module, an MIPI receiving/transmitting module, and a multiplexing core computing module, a storage controller module, a memory, and an MUX selecting module. The synchronized trigger module is for generating a synchronized trigger signal transmitted to an image acquiring module; the MIPI receiving/transmitting module is for supporting input/output of the MIPI video streams and other formats of video streams; the multiplexing core computing module is for selecting a monocular structured or a binocular structured light depth perception working mode. The apparatus flexibly adopts a monocular or binocular structured-light depth sensing manner, so as to leverage the advantages of different modes: the MIPI in, MIPI out working manner is nearly transparent to the user, so as to facilitate the user to employ the apparatus, directly obtaining the depth graph.

10 Claims, 5 Drawing Sheets

(51) Int. Cl.
*G01B 11/25* (2006.01)
*H04N 13/204* (2018.01)
*H04N 13/271* (2018.01)
*H04N 13/286* (2018.01)
*H04N 13/275* (2018.01)
*H04N 13/254* (2018.01)
*H04N 13/239* (2018.01)

(52) U.S. Cl.
CPC ......... *H04N 13/271* (2018.05); *H04N 13/275* (2018.05); *H04N 13/286* (2018.05); *H04N 2013/0081* (2013.01)

(56) References Cited

U.S. PATENT DOCUMENTS

| | | |
|---|---|---|
| 2013/0076745 A1 | 3/2013 | Kida et al. |
| 2015/0009295 A1* | 1/2015 | Kim .................. H04N 13/0239 348/47 |
| 2015/0146926 A1* | 5/2015 | Ramachandran .. G06K 9/00624 382/103 |
| 2015/0294499 A1* | 10/2015 | Wagner .............. H04N 13/0253 348/46 |
| 2017/0054962 A1* | 2/2017 | Zhou ..................... G06T 7/0057 |

FOREIGN PATENT DOCUMENTS

| | | |
|---|---|---|
| CN | 103824318 A | 5/2014 |
| CN | 103841406 A | 6/2014 |
| CN | 105222760 A | 1/2016 |

OTHER PUBLICATIONS

3D Perception of Biomimetic Eye Based on Motion Vision and Stereo Vision Wang Qingbin, Zou Wei, Xu De, Zhang Feng.

* cited by examiner

THREE-DIMENSIONAL DEPTH PERCEPTION APPARATUS AND METHOD

FIELD OF THE INVENTION

The present invention relates to the technical field of computational vision, microelectronics and human-machine interaction, and more specifically relates to a depth perception apparatus and method for a three-dimensional depth perception processor.

BACKGROUND OF THE INVENTION

Vision is a most direct and principal approach for mankind to observe and cognize the world. In a three-dimensional world we live, human vision can not only perceive luminance, color, texture information, and motion condition of a surface of an object, but also can determine its shape, space, and spatial position (depth, distance). How to enable a machine vision to real-time obtain highly precise depth information and enhance an intelligence level of a machine is a challenge for current machine vision system development. A 3D depth perception device, as a novel stereoscopic visual sensor, may obtain high-precision and high-resolution depth map information (distance information), perform real-time recognition of a three-dimensional image, capture motions, and perceive a scene. Currently, "the virtual world is infinitely closer to the real world; the human-machine interaction mode will become more natural, intuitive, and immersive." As a "portal device" for interaction between the real physical world and the virtual network world, the 3D depth perception device (RGB+Depth) will likely replace a traditional RGB camera in the near future and become a ubiquitous important device in the real world, such that a machine or an intelligent device has a 3D visual perception competence like human eyes. This facilitates natural interaction between man and machine, virtual interaction between man and the web world, and even interaction between machine and machine. Now, with the in-depth development of industries such as unmanned aerial vehicles, 3D printing, robots, virtual reality helmets, smart mobiles, intelligent households, human-face recognition payment, intelligent monitoring and the like, problems such as environment perception, human-machine natural interaction, obstacle avoidance, 3D scanning, accurate recognition and the like need to be solved. The 3D depth perception sensor processor technology, as a key generic technology, facilitates tackling these problems. It will greatly release and inspire people's scientific imagination and creativity in relevant study fields.

A structured light encoding-based three-dimensional depth technology can obtain depth information more accurately. Compared with binocular stereoscopic cameras and a ToF (Time of Flight) manner, it has advantages that the obtained depth map information is more stable and reliable, less affected by ambient light, and has a simple stereoscopic matching algorithm. As a depth perception technology that is highly cost-effective, highly reliable, and highly working range adaptable, it will become a dominant technology for human-machine interaction and intelligent devices to acquire depth.

In the prior art, a monocular mode has an advantage of a simple structure, which can acquire depth with one receiving camera, such that it is applicable to a small volume application scenario. A binocular mode has an advantage of acquiring a better depth map detail, i.e., the depth information has a higher resolution and a higher depth precision; meanwhile, it has a wider application scope, including an outdoor scenario.

SUMMARY OF THE INVENTION

In view of the drawbacks existing in the prior art, the present invention provides a three-dimensional depth perception apparatus, comprising a synchronized trigger module, an MIPI (Mobile Industry Processor Interface) receiving/transmitting module, and a multiplexing core computing module; wherein the synchronized trigger module is for generating a synchronized trigger signal that is transmitted to an image acquiring module; the MIPI receiving/transmitting module is for supporting input/output of the MIPI video streams and other formats of video streams; the multiplexing core computing module is for selecting a monocular structured light depth perception working mode or a binocular structured light depth perception working mode as needed, including a pre-processing module, a block matching disparity computing module, a depth computing module, and a depth post-processing module. The monocular structured light depth perception working mode is to calculate the depth using the acquired images from one-side (left or side) infrared camera and corresponding reference image. Where the binocular structured light depth perception working mode is to calculate the depth using the acquired images from two-side (left and side) infrared camera.

The three-dimensional depth sensing module further comprises: a storage controller module and a memory; the storage controller module is for performing read/write operations to the memory when selecting the monocular structured light depth perception working mode, while support from the memory and storage controller module is not needed in in the binocular structured light depth perception working mode; the memory is for pre-storing a reference encoding pattern of a known distance. The memory is built inside of or disposed external to the apparatus.

The three-dimensional depth sensing apparatus further comprises: an MUX selecting module that is for selecting, in the monocular structured light depth perception working mode, a reference encoding pattern read out from the memory as an output, or selecting, in the binocular structured light depth perception working mode, a pre-processed input encoding pattern inputted by the other route of camera.

The pre-processing module is for performing, in succession, video format conversion, distortion correction, conformity denoising and enhancement processing, binarization, synchronized correction processing to a received input encoding pattern.

The block matching disparity computing module is for, in the monocular structured light working mode, auto-matching the pre-processed input encoding pattern and the reference encoding pattern read out from the memory, to obtain a disparity vector corresponding an encoded image block central point of the input encoding pattern, or in the binocular structured light working mode, for performing binocular matching to two routes of input encoding patterns, to obtain a disparity vector corresponding to an encoding image block central point of one route of input encoding pattern.

The depth computing module is for computing depth information corresponding to each disparity vector using a monocular depth computation equation based on a monocular structured light working mode, or computing depth information corresponding to each disparity vector according to a binocular depth computation equation based on a binocular structured light method.

The depth post-processing module is for performing cavity compensation and denoising to the depth map, performing registration in conjunction with an input RGB image, and outputting the depth map.

The present invention further provides a three-dimensional depth perception method, characterized in that:

selecting, by a three-dimensional depth perception module, a monocular structured light depth perception working mode or a binocular structured light depth perception working mode as needed, wherein the three-dimensional depth perception module comprises a multiplexing core computing module that includes a pre-processing module, a block matching disparity computing module, a depth computing module, and a depth post-processing module.

when selecting the monocular structured-light working mode, acquiring, by a single camera, an input encoding pattern; processing, by the pre-processing module, the input encoding pattern; reading out, by a pre-processing module, a pre-stored reference encoding pattern via a storage controller, feeding the reference encoded image and the pre-processed input encoding pattern, into the block matching disparity computing module to auto-match, obtaining a matching block offset amount; processing, by the depth computing module and the depth post-processing module, the matching block offset amount, to output a depth map;

when selecting a binocular structured-light working mode, acquiring, by two cameras, an input encoding pattern concurrently, the acquired input encoding patterns, after being processed by the pre-processing module, respectively, being fed into the block matching disparity computing module, for binocular matching, thereby obtaining a matching block offset amount; processing, by the depth computing module and the depth post-processing module, the matching block offset amount to output a depth map.

Wherein, the camera performs image acquisition according to a synchronized trigger signal; and the acquired MIPI video stream and other formats of video streams are inputted and outputted through the MIPI receiving/transmitting module.

The structured light encoding-based active visual mode of the present invention achieves that a three-dimensional depth perception processor (chip or IP core or program code) may flexibility select a monocular structured-light depth perception working mode or binocular structured-light depth perception working mode through a multiplexing core computing module according to application needs, which facilitates leverage of advantages of different modes; meanwhile, a high-resolution high-precision depth map sequence may be generated in real-time by employing MIPI in and MIPI out. The MIPI working mode is nearly transparent to a user, such that the user directly obtains a depth map by replacing an MIPI camera in the original system with the processor. The three-dimensional depth perception processor may operate as a standalone chip, or as an embedded IP core to be applied in SoC, or as a program code running on a microprocessor.

DETAILED DESCRIPTION OF THE PREFERRED EMBODIMENTS

Hereinafter, the present invention will be described in further detail with reference to the accompanying drawings.

Figure 1:
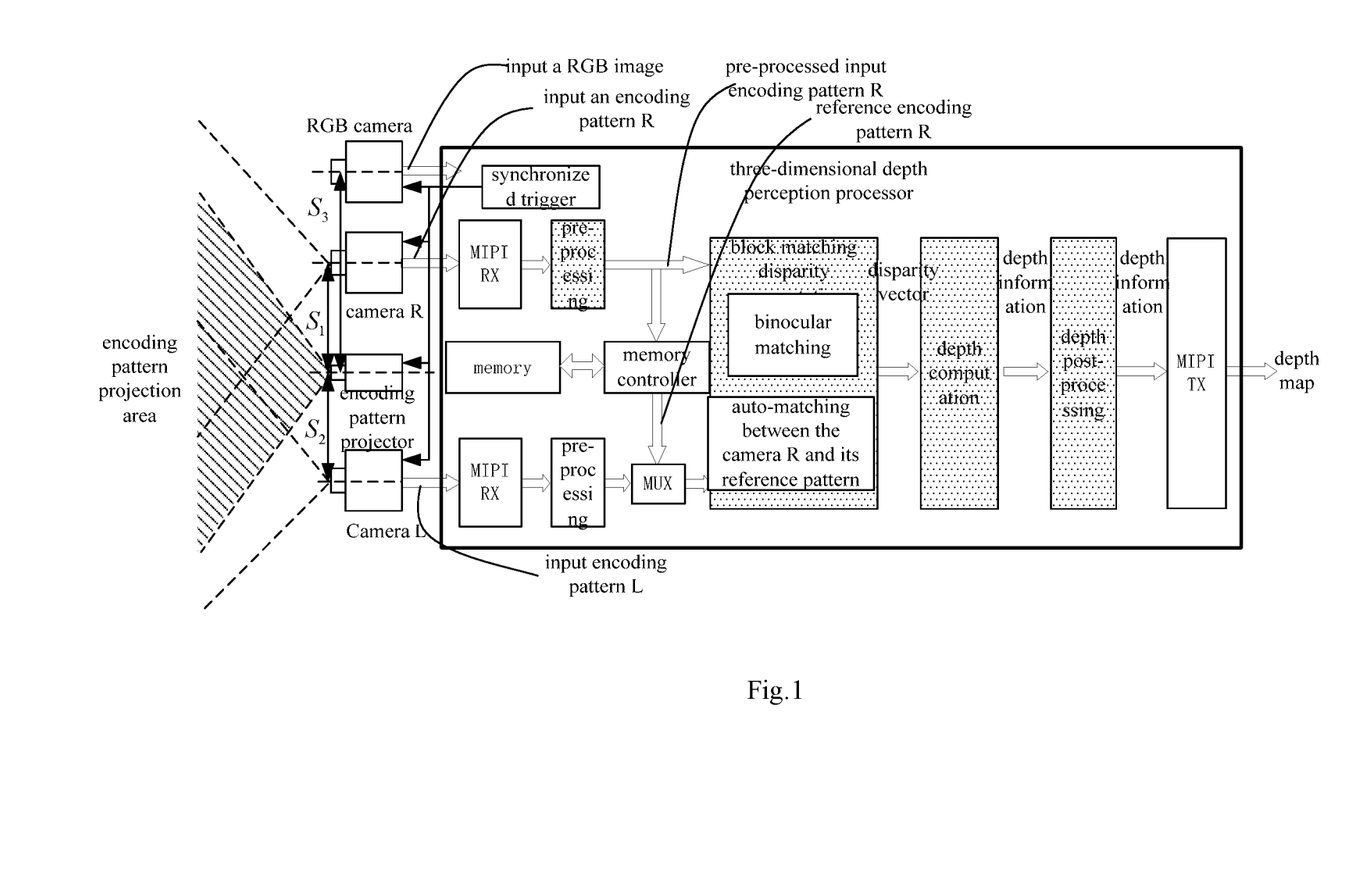
FIG. 1 illustrates a structural diagram of an image depth perception apparatus according to an embodiment of the present invention.

In a preferred embodiment, the present invention discloses a three-dimensional depth perception apparatus, as shown in FIG. 1, characterized by comprising a synchronized trigger module, an MIPI receiving/transmitting module, a pre-processing module, a block matching disparity computing module, a depth computing module, a depth post-processing module, a storage controller module, a memory, and an MUX selecting module; wherein:

the synchronized trigger module: for generating a synchronized trigger signal, which is fed to an encoding pattern projector, an RGB camera, one or two routes of cameras specifically for acquiring encoding patterns;

the MIPI receiving/transmitting module: an MIPI (Mobile Industry Processor Interface) interface is a common transmission format for camera video data streams. An input end of the processor of the present invention is embedded with an MIPI RX receiving module to support MIPI video stream input, and a parallel interface digital format or other video stream format may be selected to input; an output end is embedded with an MIPI TX transmitting module to support a depth map video stream output of an MIPI format, or a parallel interface digital format or other video stream format output may be selected. With an MIPI in, MIPI out scheme, the processor of the present invention may be conveniently integrated into other application systems, such that a user only needs to replace the MIPI camera used in the original system. In this way, a high-precision high-resolution depth map may be obtained by applying the processor of the present invention with few changes, which significantly simplifies a debugging process.

Figure 2:
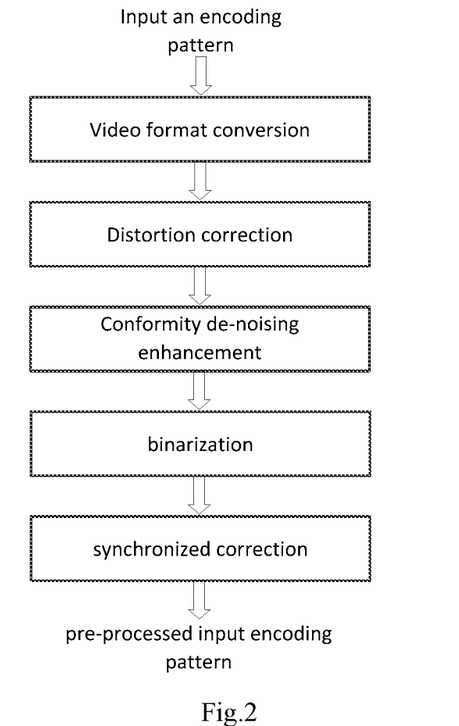
FIG. 2 illustrates a flow block diagram of a pre-processing module according to an embodiment of the present invention.

The pre-processing module, as illustrated in FIG. 2, performs adaptive and conformity pre-processing to input encoding pattern sequences with different brightness, signal-to-noise ratios, and dimensional features by, in succession, video format conversion (converting Bayer, MIPI, LVDS, HDMI into parallel interface RAW data), distortion correction, conformity denoising and enhancement processing, binarization, synchronized correction, etc., so as to make the input encoding patterns much clearer and reduce noise interference, thereby facilitating a depth perception computation in the content of the present invention.

The block matching disparity computing module: in the monocular structured light working mode, performing auto-matching to the pre-processed input encoding pattern and the reference encoding pattern read out from the memory, i.e., matching the input encoding pattern with a reference encoding pattern, wherein the input encoding pattern is matched in a format of encoding image block, and searching an optimal matching block according to a certain similarity computation criteria b, to obtain a disparity vector (offset amount) corresponding to a central point of the encoded image block. In the binocular structured light working mode, binocular matching is performed to two routes of input encoding patterns, i.e., searching an optimal matching block for a present route of input encoding pattern according to a certain similarity computation criteria based on an encoding image block in the other route of input encoding image pattern, thereby obtaining a disparity vector (i.e., offset amount) corresponding to the central point of the encoding image block of the present route of input encoding pattern.

The depth computing module: computing depth information (i.e., distance) corresponding to each disparity vector using a monocular depth computing equation based on the monocular structured light method in conjunction with parameters such as baseline distance, focal length, camera sensor physical dot pitch, and reference encoding pattern; computing depth information (i.e., distance) corresponding to each disparity vector using a binocular depth computing equation based on the binocular structured light method in conjunction with parameters such as baseline distance, focal length, and camera sensor physical dot pitch.

The depth post-processing module: performing cavity compensation and de-noising to the depth map, or performing registration in conjunction with the RGB image, and outputting, after processing, the depth map.

The storage controller module: in the monocular structured light depth perception working mode, performing read/write operations to one or more reference encoding patterns within the processor or an external memory. The binocular structured light depth perception working mode needs no support from the memory and storage controller module.

The memory: in the monocular structured-light depth perception working mode, for pre-storing one or more reference encoding pattern read/write operations of a known distance. The memory may be embedded within the processor or external to the processor, generally employing an SPI Flash and a parallel-interface Flash.

The MUX selecting module: in the monocular structured-light depth perception working mode, selecting the reference encoding pattern read out from the memory as an output; in the binocular structured light working mode, selecting the pre-processed input encoding pattern inputted by another route of camera.

As far as the above embodiment is concerned, basic functions of the processor lie in: through the multiplexing the core computing module (including the pre-processing module, block matching disparity computing module, depth computing module, and depth post-processing module, etc.), the processor may select a monocular structured light or binocular structured light working mode based on application needs; and may real-time obtain high-resolution high-precision depth information by MIPI in, MIPI out. For the monocular structured light working mode, the processor acquires, through a single camera from the external, an input encoding pattern emitted from the encoding pattern projector; a pre-processed input encoding pattern is obtained through a pre-processing module; the pre-processed input encoding pattern and the reference encoding pattern pre-stored in the storage controller are fed together to the block matching disparity computing module to perform auto-matching, thereby obtaining a disparity vector; the disparity vector is then processed by the depth computing module and depth post-processing module, thereby outputting the depth map. The binocular structured light working mode: the processor acquires, from two external cameras, an input encoding pattern emitted from the encoding pattern projector concurrently; the acquired input encoding patterns, after being processed by the pre-processing modules, respectively, are fed into the block matching disparity computing module for binocular matching, thereby obtaining a disparity vector; the disparity vector is then processed by the depth computing module and the depth post-processing module, to output a depth map. The monocular mode has an advantage of a simple structure, which can obtain depth with only one receiving camera, such that it is applicable to a small volume application scenario. The binocular mode has an advantage that a better depth map detail, i.e., the depth information has a higher resolution and a higher depth precision, can be obtained; meanwhile, it has a wider application scope, including an outdoor scenario.

The reference encoding pattern may be obtained in the following manners. However, these manners are only for illustrating the embodiments, not intended to limit the embodiments, because those skilled in the art may also obtain the reference encoding pattern in other manner: projecting a laser beam (infrared, visible light, UV light, invisible light) of a fixed pattern onto a plane (the plane may comprise a projection screen fabric, a panel and the like, for presenting a clear and steady encoding pattern) that is vertical to a central axis (Z-axis) of the encoding pattern projector and has a known positional distance d; the pattern formed on the plane is just the reference encoding pattern. Acquisition of the input encoding pattern may also employ the acquiring method above. A target object or projection space to which depth information is measured is included in the input encoding pattern. The depth information is unknown. It is easily understood that the target object has to be within a valid distance range of the encoding pattern projector and the camera.

Preferably, in another embodiment, the MIPI receiving/transmitting module not only supports an MIPI video format, but also supports a low-voltage differential signal LVDS, a high-definition multimedia interface HDMI, a parallel-interface raw data RAW, a Bayer video format, and etc.; the depth map post-processing module employs a de-noising filtering method to cancel noise and reduce cavity phenomena and makes an edge of the object in the depth graph smoother and clearer, e.g., by employing methods such as median filtering, mean filtering, etc., but not limited these traditional filtering methods, as long as such methods can reduce noise; performing registration correction to the RGB video stream image and depth video stream image to obtain inner and outer parameters of the RGB camera and depth camera, and establishing a one-to-one correspondence relationship between the depth image and the RGB image, e.g., using the ZHANG Zhengyou video camera calibration method and the like, but not limited to this calibration method.

Figure 3:
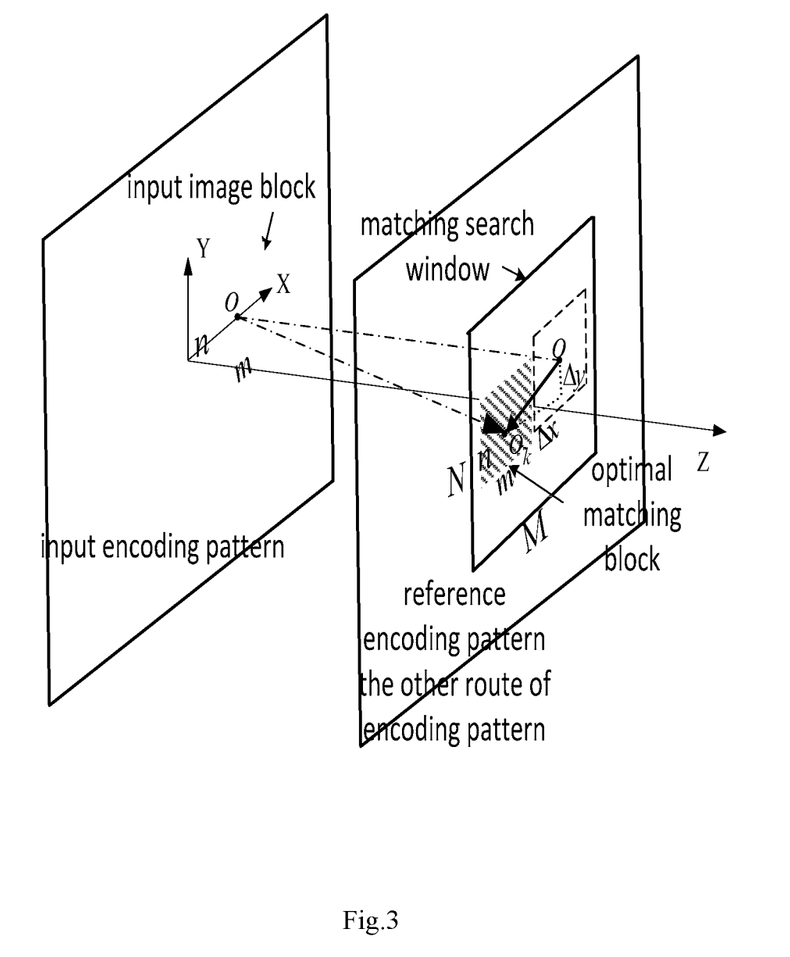
FIG. 3 illustrates a principle diagram of a block matching disparity computing module according to an embodiment of the present invention.

Preferably, in another embodiment, a working procedure of the block matching disparity computing module is provided as follows: as illustrated in FIG. 3, extracting an input image block $block_{m \times n}$ sized (m×n) from within the input encoding pattern; in the reference encoding pattern (monocular working mode) or another route of input encoding pattern (binocular structured light working mode), within a search window $search\_block_{M \times N}$ sized M×N centered about a position corresponding to the image block $block_{m \times n}$, the optimal matching block for the image block is searched according to a search policy and a similarity measurement index, wherein M, N, n, m are all integers, and M>m, N>n, thereby obtaining a displacement amount (Δx,Δy) of the image block, i.e., disparity vector. This embodiment intends to limit a specific processing procedure of the block matching disparity module.

Preferably, in another embodiment, the image block size m×n extracted by the block matching disparity computing module in the monocular structured light working mode is different from the binocular structured light working mode. Generally, the binocular structured light working mode may be smaller so as to facilitate improving depth details, enhancing X-Y direction depth resolution, and identifying a smaller object.

Preferably, in another embodiment, the depth computing module computes a depth distance d' according to the depth computation equation (1) in the monocular structured light working mode:

$$d' = \frac{fSd}{fS + \Delta x \mu d} \quad (1)$$

In the binocular structured light working mode, the depth distance d' is calculated according to the depth computation equation (2):

$$d' = \frac{2fS}{\Delta x \mu} \quad (2)$$

wherein d denotes a known distance parameter of a reference encoding pattern in a monocular structured light working mode, f denotes a camera sensor focal length, S denotes a baseline distance from the camera to the encoding pattern projector (monocular mode) or between two cameras (binocular), μ denotes a camera sensor physical dot pitch. If the camera and the encoding pattern projector are located on a same horizontal baseline, so are the two cameras and the encoding pattern projector, a horizontal displacement amount Δx is used as the offset amount input parameter for equation (1) and equation (2); if they are on a vertical baseline, a vertical displacement amount Δy is used as an offset amount input parameter for equation (1) and equation (2).

Preferably, in another embodiment, the distortion correction by the pre-processing module is for correcting optical distortion caused by the lens per se. First, a non-linear positional relationship existing between an ideal image and a distortion image is found; a lookup tale is built for spatial positions of respective pixels of a distorted picture according to the non-linear positional relationship; the input encoding pattern is then corrected according to the lookup table. The distortion correction method includes, for example, a spherical face coordinates locating method, polynomial coordinates converting method, projective invariance, and polar coordinate mapping method, but not limited to these traditional distortion correction methods.

Preferably, in another embodiment of synchronized correction performed by the pre-processing module, under the binocular structured light working mode, the synchronized trigger module of a three-dimensional depth perception-specific chip emits a synchronization signal to the encoding pattern projector and the left and right binocular cameras; the binocular cameras synchronously acquire and input the synchronization signal to the three-dimensional depth perception-specific chip; the synchronized correction sub-module of the pre-processing module may adjust, through multi-line storage, the input encoding pattern inputted by the left and right cameras back-and-forth point by point according to the pixel points, or adjust up-and-down by lines, so as to ensure alignment of the encoding pattern data inputted by the left and right cameras line by line.

The three-dimensional depth perception apparatus processor of the present invention may select a monocular structured light or binocular structured light working mode according to application needs. Hereinafter, the specific working procedures of the three-dimensional depth perception processor of the present invention will be described with respect to the two working modes.

Figure 4:
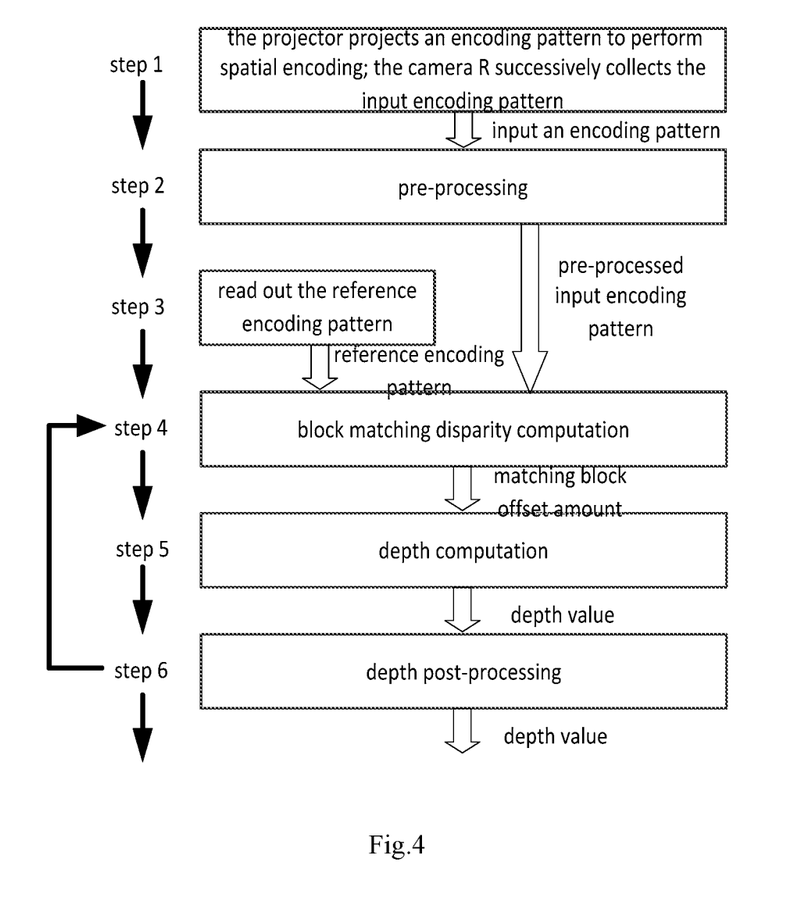
FIG. 4 illustrates a block diagram of a monocular structured-light depth perception work flow according to an embodiment of the present invention.

When a monocular structured light working mode is selected, the working procedure of the monocular structured light depth perception comprises the following steps, as shown in FIG. 4:

Step 1. projecting, by an encoding pattern projector, an encoding pattern to encode a target object or a projection space; acquiring, by a camera R, successively the input encoding pattern to feed into a three-dimensional depth perception processor;

Step 2. after distortion correction and conformity enhancement processing and the like by the pre-processing module, obtaining a pre-processed input encoding pattern that is fed to a block matching disparity computing module;

Step 3. reading out, by a storage controller, a reference encoding pattern pre-solidified in a memory, the reference encoding pattern, together with the input encoding pattern, being fed to the block matching disparity computing module through an MUX selecting module;

Step 4. performing, by the block matching disparity computing module, auto-matching to the input encoding pattern and the reference encoding pattern, i.e., matching the input encoding pattern and the reference encoding pattern, wherein the input encoding pattern is matched in the format of the encoding image block; searching an optimal matching block according to a certain similarity computation criteria, to obtain a disparity vector (offset amount) corresponding to each pixel of the input encoding pattern, and feeding the disparity vector to a depth computing module;

Step 5. computing, by the depth computing module, depth information (i.e., distance) corresponding to each disparity vector according to the monocular depth computing equation (1) with reference to parameters such as a baseline distance, a focal distance, a camera sensor physical dot pitch, and a known distance of the reference encoding pattern;

Step 6. performing, by the depth post-processing module, a cavity compensation de-noising, to perform registration correction in conjunction with an input RGB image, and finally outputting a depth map.

Figure 5:
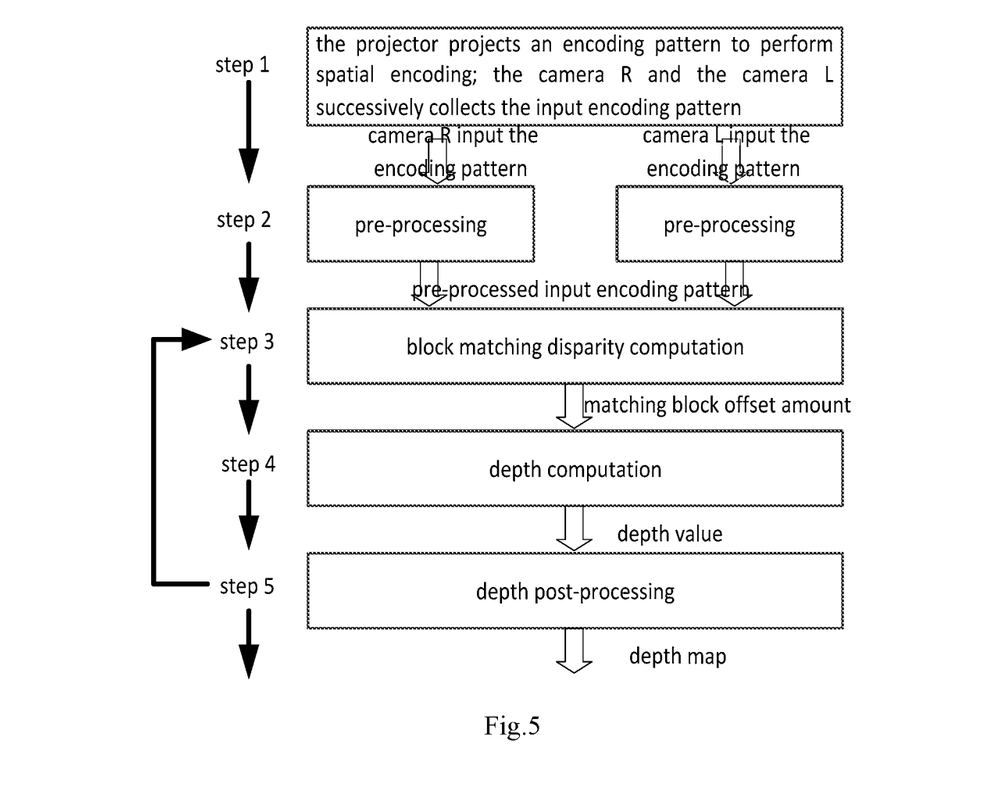
FIG. 5 illustrates a block diagram of a binocular structured-light depth perception work flow according to an embodiment of the present invention.

When a binocular structured light working mode is selected, the working procedure of the binocular structured light depth perception comprises the following steps, as shown in FIG. 5:

Step 1. projecting, by an encoding pattern projector, an encoding pattern to encode a target object or a projection space; synchronously acquiring, by a camera R and a camera L, respective input encoding patterns that are fed into a three-dimensional depth perception processor;

Step 2. After the input encoding pattern acquired by the camera R is subjected to distortion correction, conformity enhancement processing and synchronous correction and the like by the pre-processing module, obtaining a pre-processed input encoding pattern that is fed to a block matching disparity computing module; the input encoding pattern acquired by the camera L, after being processed by the pre-processing module with the same function and then by the MUX selecting module, being transmitted to the block matching disparity computing module simultaneously with the input encoding pattern of the camera R;

Step 3. performing, by the block matching disparity computing module, binocular matching to two routes of input encoding patterns, i.e., searching an optimal matching block for one route of input encoding pattern according to a certain similarity computation criteria based on an encoding image block in the other route of input encoded image pattern, thereby obtaining a disparity vector (i.e., offset amount) corresponding to each pixel of the encoded image block of the present route of input encoding pattern, and feeding the disparity vector to the depth computing module;

step 4. computing, by the depth computing module, depth information (i.e., distance) corresponding to each disparity vector according to the binocular depth computing equation (2) with reference to parameters such as a baseline distance, a focal distance, and a camera sensor physical dot pitch;

step 5. performing, by a depth post-processing module, a cavity compensation de-noising, to perform registration correction in conjunction with an input RGB image, and finally outputting a depth map.

The embodiments above may operate as a standalone chip, or as an embedded IP core applied in SoC, or as a program code running on a microprocessor. The input output video interface format of the processor according to the present invention is not limited to the listed MIPI, LVDS, HDMI, RAW, Bayer, etc.; instead, they may also apply other video interfaces. The present invention not only supports structured light modes generated by different types of laser encoding patterns, e.g., infrared, visible light, UV, invisible light, etc., but also may use projection solutions for different patterns, e.g., encoding patterns such as dot shape, block shape, cross shape, strip shape, symbols and the like. Therefore, without departing from the spirit and scope of the present invention, all modifications and perfections shall be included within the scope of the claims above.

The invention claimed is:

1. A three-dimensional depth perception apparatus, comprising:
   a synchronized trigger module;
   an MIPI receiving/transmitting module; and
   a multiplexing core computing module; wherein
   the three-dimensional depth perception apparatus has two working modes: (1) a monocular structured light depth perception working mode; and (2) a binocular structured light depth perception working mode;
   the synchronized trigger module is for generating a synchronized trigger signal to be transmitted to an image acquiring module including an encoding pattern projector and a first camera disposed on one side of the encoding pattern projector for the monocular structured light depth perception working mode, and the encoding pattern projector, the first camera and a second camera disposed on the other side of the encoding pattern projector for the binocular structured light depth perception working mode for acquiring encoding patterns;
   the MIPI receiving/transmitting module is for supporting input/output of MIPI video streams and other formats of video streams; and
   the multiplexing core computing module is for selecting the monocular structured light depth perception working mode or the binocular structured light depth perception working mode as needed, wherein the multiplexing core computing module comprises:
      a pre-processing module, wherein under the binocular structured light depth perception working mode, the first camera and the second camera synchronously acquire and input the synchronization trigger signal to a three-dimensional depth perception-specific chip; the pre-processing module adjusts, through a multi-line storage, input encoding pattern inputted by the first camera and the second camera back-and-forth point by point according to pixel points, or adjusts up-and-down by lines, so as to ensure alignment of the input encoding pattern inputted by the first camera and the second camera line by line;
      a block matching disparity computing module;
      a depth computing module, wherein the monocular structured light depth perception working mode is to calculate depth using acquired images from either the first camera or the second camera and corresponding reference image; and the binocular structured light depth perception working mode is to calculate the depth using acquired images from the first camera and the second camera; and
      a depth post-processing module.

2. The apparatus according to claim 1, further comprising: a storage controller module and a memory;
   the storage controller module is for performing read/write operations to the memory when selecting the monocular structured light depth perception working mode for the monocular structured light depth perception working mode; and
   the memory is for pre-storing a reference encoding pattern of a known distance.

3. The apparatus according to claim 2, wherein the memory is built inside of or disposed external to the apparatus.

4. The apparatus according to claim 1, further comprising: an MUX selecting module;
   wherein the MUX selecting module is for selecting a reference encoding pattern read out from the memory as an output in the monocular structured light depth perception working mode, or selecting a pre-processed input encoding pattern inputted by another route of camera in the binocular structured light depth perception working mode.

5. The apparatus according to claim 1, wherein the pre-processing module is for performing, in succession, video format conversion, distortion correction, conformity denoising and enhancement processing, binarization, and synchronized correction processing to a received input encoding pattern.

6. The apparatus according to claim 1, wherein the block matching disparity computing module is for, in the monocular structured light depth perception working mode, auto-matching a pre-processed input encoding pattern and a reference encoding pattern read out from a memory, to obtain a disparity vector corresponding an encoded image block central point of the input encoding pattern, or in the binocular structured depth perception light working mode, for performing binocular matching to two routes of input encoding patterns, to obtain a disparity vector corresponding to an encoding image block central point of one route of input encoding pattern.

7. The apparatus according to claim 1, wherein the depth computing module is for computing depth information corresponding to a disparity vector using a monocular depth computation equation based on a monocular structured light method, or computing depth information corresponding to a disparity vector according to a binocular depth computation equation based on a binocular structured light method.

8. The apparatus according to claim 1, wherein the depth post-processing module is for performing cavity compensation and de-noising to a depth map, performing registration in conjunction with an input RGB image, and outputting the depth map.

9. A three-dimensional depth perception method, wherein multiplexing core selecting, by a three-dimensional depth perception module having two working modes: (1) the monocular structured light depth perception working mode; and (2) the binocular structured light depth perception working mode, the monocular structured light depth perception working mode or the binocular structured light depth perception working mode as needed, the three-dimensional depth perception module comprising an encoding pattern projector;

a first camera disposed on one side of the encoding pattern projector for the monocular structured light depth perception working mode;

a second camera, together with the encoding pattern projector and the first camera, disposed on the other side of the encoding pattern projector for the binocular structured light depth perception working mode for acquiring encoding patterns; and a multiplexing core computing module that includes:

a pre-processing module;

a block matching disparity computing module;

a depth computing module, wherein the monocular structured light depth perception working mode is to calculate depth using acquired images from either the first camera or the second camera and corresponding reference image; and the binocular structured light depth perception working mode is to calculate the depth using acquired images from the first camera and the second camera; and a depth post-processing module, the method further comprising:

when selecting the monocular structured light depth perception working mode, acquiring, by a single camera of the first camera and the second camera, an input encoding pattern; processing, by the pre-processing module, the input encoding pattern; reading out, by a pre-processing module, a pre-stored reference encoding pattern via a storage controller, feeding the pre-stored reference encoding pattern and the pre-processed input encoding pattern, into the block matching disparity computing module to auto-match, obtaining a matching block offset amount; processing, by the depth computing module and the depth post-processing module, the matching block offset amount, to output a depth map;

when selecting a binocular structured light depth perception working mode, acquiring, by two cameras of the first camera and the second camera, an input encoding pattern concurrently, the acquired input encoding patterns, after being processed by the pre-processing module, respectively, being fed into the block matching disparity computing module, for binocular matching, thereby obtaining a matching block offset amount; processing, by the depth computing module and the depth post-processing module, the matching block offset amount to output a depth map.

10. The method according to claim 9, wherein the first camera and the second camera perform image acquisition according to a synchronized trigger signal; and perform inputting and outputting to acquired MIPI video stream and other formats of video streams through the MIPI receiving/transmitting module.

* * * * *